United States Patent [19]

Ilardi et al.

[11] 4,183,901
[45] Jan. 15, 1980

[54] PROCESS FOR CRYSTALLIZATION OF ANHYDROUS SODIUM CARBONATE

[75] Inventors: Joseph M. Ilardi, North Brunswick; Eric Rau, Lawrenceville, both of N.J.

[73] Assignee: FMC Corporation, Philadelphia, Pa.

[21] Appl. No.: 927,187

[22] Filed: Jul. 24, 1978

Related U.S. Application Data

[63] Continuation-in-part of Ser. No. 798,709, May 19, 1977, abandoned, which is a continuation-in-part of Ser. No. 651,943, Jan. 23, 1976, abandoned.

[51] Int. Cl.² .......................... C01D 7/00; C01D 7/40
[52] U.S. Cl. .................................. 423/206 T; 423/265; 423/421; 23/302 T; 23/300
[58] Field of Search ............... 423/206 T, 421, 422, 423/425, 427, 265, 266; 23/302 T, 258, 300

[56] References Cited

U.S. PATENT DOCUMENTS

| | | | |
|---|---|---|---|
| 3,103,413 | 9/1963 | Blumenthal | 423/421 |
| 3,656,892 | 4/1972 | Bourne et al. | 423/206 T |
| 3,738,938 | 6/1973 | Barrett | 423/421 |
| 3,796,794 | 3/1974 | Ilardi | 423/421 |
| 3,836,628 | 9/1974 | Ilardi et al. | 423/206 T |
| 3,852,427 | 12/1974 | Hoffman et al. | 423/422 |
| 3,855,397 | 12/1974 | Hoffman et al. | 423/422 |
| 3,933,977 | 1/1976 | Ilardi et al. | 423/206 T |

FOREIGN PATENT DOCUMENTS

| | | | |
|---|---|---|---|
| 46-16664 | 5/1971 | Japan | 423/419 |
| 48-17160 | 5/1973 | Japan | 423/422 |

OTHER PUBLICATIONS

Sienko et al., Chemistry, 2nd Edition, McGraw Hill Book Co., N.Y., N.Y. 1961, pp. 196–199.

*Primary Examiner*—O. R. Vertiz
*Assistant Examiner*—Gary P. Straub
*Attorney, Agent, or Firm*—Frank Ianno

[57] ABSTRACT

Anhydrous sodium carbonate is crystallized from saturated aqueous sodium carbonate solutions at temperatures in the range of 104° to below 109° C. by adding to the solution very small proportions of additives which function to reduce the transition temperature of monohydrate to anhydrous sodium carbonate.

11 Claims, No Drawings

PROCESS FOR CRYSTALLIZATION OF ANHYDROUS SODIUM CARBONATE

CROSS REFERENCE TO RELATED APPLICATIONS

This application is a continuation-in-part of U.S. Application Ser. No. 798,709, now abandoned filed on May 19, 1977 in the names of Joseph M. Ilardi and Eric Rau, which is a Continuation-in-Part of U.S. Application Ser. No. 651,943, filed on Jan. 23, 1976 in the names of Joseph M. Ilardi and Eric Rau, now abandoned.

This invention relates to the production of anhydrous sodium carbonate crystals. More particularly, the invention relates to a method of treating aqueous solutions of sodium carbonate, in order to alter the transition temperature at which sodium carbonate in anhydrous form customarily crystallizes.

Conventionally, crystal growth of anhydrous sodium carbonate crystals in solutions containing sodium carbonate is effected by maintaining the solutions under pressure or by adding substantial quantities of an inorganic salt or alkali such as potassium carbonate, sodium chloride or sodium hydroxide. A typical prior art process is disclosed by Keene et al in U.S. Pat. No. 2,133,455, issued Oct. 8, 1938 wherein it is disclosed that the transition from monohydrate to anhydrous $Na_2CO_3$ lies above the normal boiling point of a saturated aqueous solution of sodium carbonate, the transition point being 109° C., the boiling point being 104.9° C. at normal atmospheric pressure (760 mm of Hg). In order to obtain anhydrous $Na_2CO_3$ from such saturated solutions of sodium carbonate, it is necessary to increase the boiling point of the solution to at least 109° C. by either heating the solution under superatmospheric pressure to at least 109° C. or by adding and dissolving substantial quantities of solids to increase the boiling point of the solution at atmospheric pressure to at least 109° C. Keene et al accomplish this through addition of relatively substantial quantities, 6 to 7% by weight, of inorganic materials such as sodium chloride or hydroxide. By this technique, the crystallization can be carried out at the transition temperature, yet below the boiling point of the aqueous saturated sodium carbonate solution containing the inorganic additive. Wynn in U.S. Pat. No. 1,907,987, issued May 9, 1933 employs a pressurized vessel to increase the boiling point of the solution to the normal transition temperature. Howard et al in U.S. Pat. No. 3,425,795, issued Feb. 4, 1969, use from 20 to 30% by weight potassium carbonate as an additive in order to effect anhydrous sodium carbonate crystallization by maintaining the solution in excess of the transition temperature. In contrast to these prior art techniques, the present invention employs additives in very small amounts, that is, in the parts per million range, which function by reducing the temperature at which transition from monohydrate to anhydrous sodium carbonate can take place.

In accordance with the present invention, there is provided a process for preparing anhydrous sodium carbonate crystals from saturated sodium carbonate aqueous solutions containing from about 25 to 30% by weight sodium carbonate, said solutions containing not more than about 0.4% of dissolved sulfate ($SO_4$) ions, comprising adding to said solutions at least 25 to about 5,000 ppm (parts per million) by weight, based on the weight of said solutions, of an additive selected from the group consisting of maleic acid-alkanol telomers having the formula

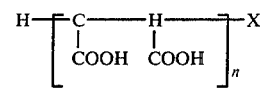

wherein n is an integer of about 1 to 8 and X represents RCHOH, R being either hydrogen or an alkyl group of 1 to 5 carbon atoms; sodium tripolyphosphate; benzoic acid; phenol; and mixtures of same; and evaporating water from said solutions at a temperature of about 104 to below 109° C., whereby anhydrous sodium carbonate in crystalline form is prepared.

The preferred additives for modification of the transition temperature in accordance with the present invention are the maleic acid-alkanol telomers or mixtures of same with sodium tripolyphosphate in all proportions. The aforesaid mixtures of telomers and sodium tripolyphosphate containing 70 to 30% of telomer and 30 to 70% by weight, based on the weight of such mixtures, of sodium tripolyphosphate, are especially preferable. Particularly advantageous for use in the present invention is the additive of at least 35 ppm of an additive mixture comprising maleic acid-methanol telomers and sodium tripolyphosphate.

Generally speaking, there is no upper limit on the quantity of additive that is operative, and the amount added need not change the boiling point of the saturated sodium carbonate solution. Amounts in excess of 5,000 ppm are not considered necessary to practice the invention. The preferred range of additive concentration is between 35 and 1,000 ppm with between 35 and 500 ppm being especially preferred to obtain optimum sized product.

Phenol and benzoic acid, while also suitable for use as additives in accordance with the present invention, have been found to be somewhat less effective in reducing the transition temperature, and, for this reason, they are less preferable.

The maleic acid telomers are lower molecular weight polymers formed by reacting a chain transfer agent, or telogen with an olefinic monomer of taxogen. They may be described with reference to the following formula:

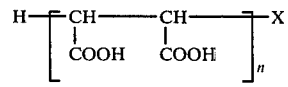

wherein n is an integer of about 1 to 8 and X represents RCHOH, R being hydrogen or an alkyl group of 1 to 5 carbon atoms. Preferably, R is hydrogen, since maleic acid-methanol telomers constitute the preferred telomer additive for use in accordance with the present invention. Telomers based on alkanols having up to about 6 carbon atoms are also considered of general utility in practicing the present invention.

It has been found that the presence of sulfate ions in more than very minor amounts apparently counteracts the desired effect of the additive in decreasing the transition temperature. More particularly, it has been found that the aqueous sodium carbonate solution which is treated in accordance with this invention should contain not more than about 0.4% by weight of dissolved sulfate ions.

The process of the present invention offers a substantial advantage in sodium carbonate processing in that addition of the aforementioned additives effectively reduces the temperature of transition of sodium carbonate monohydrate to crystalline anhydrous sodium carbonate to below 109° C. The transition point of such saturated sodium carbonate aqueous solution is generally considered to be 109° C. Thus, the present invention allows crystals of anhydrous sodium carbonate to nucleate and grow while water is evaporated therefrom, normally by boiling, at temperatures of about 104° to below 109° C. The precise temperature, below 109° C., at which the saturated solution of sodium carbonate will boil will depend upon the specific pressure at which boiling is carried out and the amounts, if any, of soluble materials, e.g. inorganic salts, additives and the like, which may be in the solution of saturated sodium carbonate being boiled. Pressures of 680 mm of Hg and above are desirable to assure that the saturated solutions have boiling temperatures of at least 104° C. When necessary, the pressure over the boiling solution may be maintained by conventional closed vessels which may be pressurized or operated at a vacuum. In the preferred mode of operation of the invention the additives are present in such small proportions that no detectable change in boiling point is observable. If larger amounts of additives are employed, there may be some measurable increase in boiling point. So far as applicants are aware, there is no prior process which allows for crystalline anhydrous sodium carbonate to be prepared under these conditions of temperature and pressure.

The present invention is applicable to the production of crystalline anhydrous sodium carbonate from aqueous solutions such as are produced in the processing of crude trona, the principal mineral source of sodium carbonate which consists essentially of sodium sesquicarbonate ($Na_2CO_3.NaHCO_3.2H_2O$) and 4 to 6% insoluble materials consisting mainly of shale. Trace quantities of organic matter and other inorganic salts are also present.

In the monohydrate process for production of soda ash as disclosed, for example, in U.S. Pat. No. 2,962,348, issued to Seglin et al on Nov. 29, 1960, crude trona is calcined at a temperature sufficient to convert the trona to sodium carbonate. Generally, calcination temperatures of 150° to 800° C. are employed. If no organic removal steps are to be used prior to evaporative crystallization of the sodium carbonate solution, calcination temperatures of 400° to 800° C., preferably 500° to 550° C. are used. If organic removal steps are utilized prior to evaporative crystallization, such as by treatment of the solution with activated carbon, calcination temperatures of 150° to 350° C., preferably 150° to 170° C., are suitable. After calcination, the crude carbonate is dissolved in water to form a crude solution which is then clarified and filtered to remove insoluble materials. Such clarified solutions are conventionally crystallized as sodium carbonate monohydrate which is then dried to form an anhydrous sodium carbonate which is a pseudomorph of the sodium carbonate monohydrate but is not a crystalline anhydrous sodium carbonate. The aforesaid clarified monohydrate process solutions are particularly suitable for treatment in accordance with the present invention.

While the invention is of special utility in connection with the treatment of solutions produced in the monohydrate process, the invention can be considered generally applicable to aqueous saturated sodium carbonate solutions produced by other soda ash manufacturing processes.

Besides trona, other ores used as a source of sodium carbonate are nahcolite ($NaHCO_3$), thermonatrite ($Na_2CO_3.H_2O$) and dawsonite. The invention is applicable as well to the treatment of aqueous saturated sodium carbonate process solutions resulting from these ores.

A further embodiment of the present invention comprises a continuous process for carrying out the present invention in which a saturated sodium carbonate solution containing about 25 to 5,000 ppm of the additive, such as a maleic acid-methanol telomer and sodium tripolyphosphate additive system, is continuously added to a stirred, approximately 30% by weight, aqueous slurry of crystalline anhydrous sodium carbonate, the slurry normally boiling at temperatures of from about 104° to below 109° C. and preferably at 105°–106° C., crystallizing anhydrous sodium carbonate in the presence of said additive, continuously evaporating water from the slurry, and continuously or intermittently withdrawing a portion of said slurry, separating the crystals from their mother liquor and drying said crystals, whereby crystalline anhydrous $Na_2CO_3$ is recovered. The remaining mother liquor may be recycled to the slurry being evaporated, or discarded. If the mother liquor is recycled, provision for removing a purge stream of mother liquor is desirable to prevent build-up of impurities, such as sulfates, which would adversely affect the process. If desired, the additive may be introduced into the slurry separately from the saturated sodium carbonate solution to maintain about 25 to 5,000 ppm of such additive in the slurry.

The process of the present invention can produce anhydrous crystals of commercial quality, preferably with bulk densities being in the range of 65 to 68 pounds per cubic foot and crystal sizing being 94% +200 mesh (U.S. Standard).

The invention is further illustrated by the following examples which are not considered to be limitative of its scope.

EXAMPLE I

Five hundred cc of a saturated reagent grade $Na_2CO_3$ solution was placed into a 2 liter, baffled, round bottom flask. Into this solution was placed 500 ppm maleic acid-methanol telomer (based on the weight of the 500 cc sodium carbonate solution). Agitation was started using a teflon paddle stirrer at 300 rpm. After 200 cc water was evaporated at a barometric pressure of 759 mm Hg and a temperature of 105° C., the entire flask contents were emptied into a centrifuge and the crystal product washed with methanol and dried. The product was a mixture of crystalline anhydrous $Na_2CO_3$ and $Na_2CO_3.H_2O$ having an LOI (loss of ignition) of 11% (a total monohydrate product would have about a 15% LOI).

EXAMPLE II

The same procedure was carried out as in Example I except for the use of 50 ppm telomer and 50 ppm sodium tripolyphosphate placed in the feed solution. The barometer reading was 753 mm Hg and the boiling point 105° C. The product was crystalline anhydrous $Na_2CO_3$ displaying an LOI of 3% mostly due to adhering mother liquor. The addition of STPP to the telomer allowed much lower additive levels to be effective in producing anhydrous $Na_2CO_3$.

EXAMPLE III

This run was identical to Examples I and II except that the additive concentrations were dropped to 10 ppm telomer and 25 ppm STPP. The product, grown at 758 mm Hg and a temperature of 105° C., was a well formed crystalline anhydrous $Na_2CO_3$ having an LOI of 1.9%. The low additive levels indicate their effectiveness in causing the metastable crystalline, anhydrous $Na_2CO_3$ to nucleate and grow under atmospheric boiling conditions.

EXAMPLE IV

A procedure similar to the foregoing examples was carried out except that the feed solution was a clarified saturated solution of sodium carbonate prepared according to the monohydrate process by calcining trona ore, dissolving it in water and filtering the solution to remove insolubles therefrom. This feed solution analyzed as follows: 179 ppm C; 27.2% $Na_2CO_3$; 0.39% $NaHCO_3$; 0.08% $SO_4^=$; 0.06% $Cl^-$; 0.54 ppm Ca; 4.9 ppm Mg.

50 ppm maleic acid-methanol telomer and 50 ppm sodium tripolyphosphate were added. Boiling point and pressure were the same as Example I. The resulting product was crystallized anhydrous $Na_2CO_3$ with an LOI or 5.2%.

EXAMPLE V

Comparative Example, Not Within Scope of the Invention

Example IV was repeated using a process solution containing 0.48% $SO_4$ ions. Telomer at the 400 ppm level and sodium tripolyphosphate at the 50 ppm level were not effective in altering the transition point.

EXAMPLE VI

Example IV was repeated using 30 ppm phenol as the sole additive. Crystalline anhydrous $Na_2CO_3$ with an LOI of 0.5% was obtained.

EXAMPLE VII

Example VI was repeated except that 50 ppm benzoic acid was used as the sole additive. Crystalline anhydrous $Na_2CO_3$ with an LOI of 2% was obtained.

EXAMPLE VIII

A saturated reagent grade sodium carbonate solution containing 50 ppm maleic acid-methanol telomer and 50 ppm sodium tripolyphosphate was used in the example. The procedure used was similar to Example I except that means for reducing and maintaining a vacuum over the solution were provided. The temperature (and pressure) were varied to determine the lowest temperature at which $Na_2CO_3$ could be nucleated and grown, which was shown to be 104° C. at about 690 mm Hg pressure. At 102° C. a crystalline anhydrous slurry of $Na_2CO_3$ converted to $Na_2CO_3.H_2O$. This example indicates that the effectiveness of the additives commences at about 104° C.

EXAMPLE IX

This example demonstrates that the invention can be operated as a continuous process.

Run A—Process of the Invention

To four gallons of the sodium carbonate process solution as described in Example IV were added 50 ppm maleic anhydride methanol telomer and 50 ppm sodium tripolyphosphate. 600 cc of this solution was placed in a 2 liter, stirred, round bottom flask fitted with a heating mantle, a condenser, a bottom outlet for slurry withdrawal and an outlet just below the one liter level for mother liquor withdrawal. Water was evaporated until the slurry volume reached 350 cc and the slurry density of crystals was 30% by weight. When these conditions were met feed solution was pumped in continuously and periodic slurry withdrawal was made.

Pressure was atmospheric (about 760 mm of Hg), temperature was 105°–106° C., the evaporation rate was 1.60 ml/min., the feed rate was 2.57 ml/min., slurry density (weight of slurry solids divided by the total weight of liquid and solids multiplied by 100) was 30.8% by weight.

Average residence time was 6.0 hours with the continuous operation being carried out for 37 hours. Average volume was about 450 cc.

Run B—Comparative Run Without Additives Being Used

The procedure was repeated under similar conditions except that no telomer or tripolyphosphate additives were used in order to provide a comparative analysis with conventionally produced monohydrate crystals. Comparative analyses of the products are set forth below:

| U.S. Standard Mesh Size | Run A Crystalline Anhydrous $Na_2CO_3$ Size Distribution-Percent By Weight | Run B Crystalline $Na_2CO_3.H_2O$ |
|---|---|---|
| +30 | 15 | 17 |
| +40 | 38 | 47 |
| +50 | 61 | 74 |
| +70 | 74 | 88 |
| +100 | 84 | 95 |
| +200 | 94 | 99 |
| Bulk Density | 67.6 lbs/ft$^3$ | 60.3 lbs/ft$^3$ |
| LOI | 2.7% | 15.2% |

This example demonstrates that under almost identical conditions, except for the presence of additives, anhydrous sodium carbonate crystals can be prepared in crystallizers commonly used to produce monohydrate crystals. The anhydrous crystals have a desirable high bulk density and suitable particle size distribution. Thus, anhydrous crystals of commercial quality can be produced in accordance with the above embodiment of the invention with only very minor changes in conventional monohydrate processing without the need for special equipment.

Example IX—Run A was continued after equilibrium was achieved with higher sulfate-containing feeds up to 0.48% by weight of sulfate and anhydrous sodium carbonate crystals continued to be obtained. This indicates that in a continuous process the system is not as sensitive to sulfate contamination as in a batch process and that somewhat higher sulfate concentrations can be tolerated in the continuous mode of operating the invention. However, to avoid possible reversion of the crystalline product being produced in the system from anhydrous to the monohydrate form of sodium carbonate, it is preferred to operate the continuous process with sulfate levels not greater than about 0.4% by weight in the feed liquor, even though somewhat higher sulfate levels may be tolerated in a continuous process.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for preparing crystalline anhydrous sodium carbonate from saturated sodium carbonate aqueous solutions, the solutions containing not more than about 0.4% by weight of sulfate ions, comprising adding to said solutions from about 25 to 5,000 parts per million by weight of an additive selected from the group consisting of maleic acid-alkanol telomers having the formula:

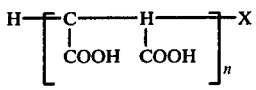

wherein n is an integer of about 1 to 8 and X represents RCHOH, R being either hydrogen or an alkyl group of 1 to 5 carbon atoms; sodium tripolyphosphate; benzoic acid; phenol; and mixtures of same; and evaporating water from said solutions at temperatures of from about 104° to below 109° C. whereby anhydrous crystalline sodium carbonate is formed.

2. The process of claim 1 wherein said additive is a maleic acid-methanol telomer.

3. The process of claim 1 wherein said additive is a mixture of maleic acid-methanol telomer and sodium tripolyphosphate.

4. The process of claim 3 wherein the quantity of said additive is at least about 35 parts per million.

5. Process of claim 1 wherein said additive is phenol.

6. Process of claim 1 wherein said additive is benzoic acid.

7. The process of claim 1 wherein said aqueous sodium carbonate solution is produced in the monohydrate process by calcining crude trona to prepare crude sodium carbonate, dissolving the crude sodium carbonate in water to produce a crude sodium carbonate solution, filtering said solution to remove insoluble materials therefrom, said solution being a saturated solution containing 25 to 30.5% sodium carbonate.

8. A continuous process for producing crystalline anhydrous sodium carbonate comprising continuously adding a saturated solution of sodium carbonate containing from about 25 to 5,000 parts per million of a mixture of a maleic acid-methanol telomer having the formula:

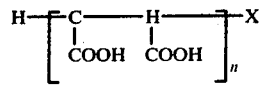

wherein n is an integer of about 1 to 8 and X represents RCHOH, and sodium tripolyphosphate to a slurry of anhydrous sodium carbonate crystals in water having a density of about 30% by weight, said solution having no more than about 0.4% by weight of sulfate ions, while maintaining said slurry at a temperature of about 105° to about 106° C., continuously evaporating water from said slurry and crystallizing anhydrous sodium carbonate crystals in the presence of said telomer and sodium tripolyphosphate, withdrawing a portion of said slurry, separating said crystals from said withdrawn portion of said slurry, drying said crystals and recovering crystalline anhydrous sodium carbonate.

9. The process of claim 8 wherein the saturated solution contains at least 35 ppm of a mixture of said maleic acid-methanol telomer and sodium tripolyphosphate.

10. The process of claim 8 wherein the anhydrous sodium carbonate crystals have a bulk density of 65 to 68 pounds per cubic foot.

11. A continuous process for producing crystalline anhydrous sodium carbonate comprising continuously adding an aqueous solution of sodium carbonate to a slurry of anhydrous sodium carbonate crystals in water, said solution having no more than about 0.4% by weight of sulfate ions, maintaining said slurry at a temperature of from about 104° to below 109° C., maintaining in said slurry from about 25 to 5,000 parts per million of an additive selected from the group consisting of a maleic acid-methanol telomer having the formula

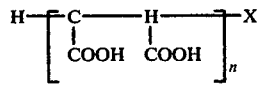

wherein n is an integer of about 1 to 8 and X represents RCHOH, R being either hydrogen or an alkyl group of 1 to 5 carbon atoms; sodium tripolyphosphate; benzoic acid; phenol; and mixtures of same; continuously evaporating water from said slurry and crystallizing anhydrous sodium carbonate crystals in the presence of said additive, withdrawing a portion of said slurry, separating said crystals from the withdrawn portion of said slurry, drying said crystals and recovering crystalline anhydrous sodium carbonate.

* * * * *

UNITED STATES PATENT AND TRADEMARK OFFICE
CERTIFICATE OF CORRECTION

PATENT NO. : 4,183,901
DATED : January 15, 1980
INVENTOR(S) : Joseph M. Ilardi and Eric Rau It is certified that error appears in the above-identified patent and that said Letters Patent are hereby corrected as shown below:

Column 2, line 5, formula "H" should read $-\underset{\underset{COOH}{|}}{CH}-$;

line 25, "additive" should read --addition--. Column 7, line 22, formula "H" should read $-\underset{\underset{COOH}{|}}{CH}-$.

Column 8, line 5, claim 8, formula "H" should read $-\underset{\underset{COOH}{|}}{CH}-$;

line 38, claim 11, "the formula" should read --the formula:--; line 40, formula "H" should read $-\underset{\underset{COOH}{|}}{CH}-$.

Signed and Sealed this

First Day of July 1980

[SEAL]

Attest:

SIDNEY A. DIAMOND

Attesting Officer

Commissioner of Patents and Trademarks